United States Patent
Hobbs et al.

(10) Patent No.: US 6,826,437 B2
(45) Date of Patent: Nov. 30, 2004

(54) ASSOCIATION OF PROCESS CONTEXT WITH CONFIGURATION DOCUMENT FOR MANUFACTURING PROCESS

(75) Inventors: Barry R. Hobbs, Austin, TX (US); Yurong Shi, Austin, TX (US); Russell C. Brown, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 161 days.

(21) Appl. No.: 10/085,956

(22) Filed: Feb. 28, 2002

(65) Prior Publication Data

US 2003/0163213 A1 Aug. 28, 2003

(51) Int. Cl.[7] ............................................. G06F 19/00
(52) U.S. Cl. ........................ 700/99; 700/83; 438/16; 707/104
(58) Field of Search .................. 700/121, 95, 115–117, 700/83, 86–87, 108, 96, 99; 438/14, 16, 18; 707/104; 708/190; 716/1–21

(56) References Cited

U.S. PATENT DOCUMENTS

| | | | |
|---|---|---|---|
| 6,000,830 A | * | 12/1999 | Asano et al. ............... 700/121 |
| 6,035,293 A | * | 3/2000 | Lantz et al. .................... 707/1 |
| 6,334,122 B1 | | 12/2001 | Brown .......................... 707/2 |
| 6,397,225 B1 | | 5/2002 | Brown et al. ............ 707/104.1 |
| 6,415,193 B1 | * | 7/2002 | Betawar et al. ............... 700/97 |

* cited by examiner

Primary Examiner—Kidest Bahta
(74) Attorney, Agent, or Firm—Hamilton & Terrile, LLP; Stephen A. Terrile

(57) ABSTRACT

A method, system and computer program product to isolate information related to performing a manufacturing process, called a configuration document, from the context in which the information is used. A context/configuration association can be independently established between a process context and a context-free configuration document including instructions for performing a manufacturing process. Because the context/configuration association is independent of both the process context and the context-free configuration document, the context/configuration association can be independently reviewed and approved without affecting other process contexts or configuration documents.

21 Claims, 3 Drawing Sheets

ASSOCIATION OF PROCESS CONTEXT WITH CONFIGURATION DOCUMENT FOR MANUFACTURING PROCESS

BACKGROUND OF THE INVENTION

1. Field of the Invention

The present invention relates generally to factory systems and, more particularly, to implementing changes to the manufacturing process simply and efficiently.

2. Description of the Related Art

Technological advances have produced increasingly complex manufacturing systems. For example, manufacturing of integrated circuits is perhaps the most complex manufacturing process in existence today. Factors contributing to this complexity include constant device miniaturization, process intricacy, product diversity, and changing technologies. Management of the semiconductor manufacturing process is accordingly complex and can involve planning thousands of steps to be performed on a silicon wafer to produce a fully packaged and integrated electronic component.

In most factories, it is desirable to have a single system that controls product flow and equipment usage. Such a system is referred to herein as a factory system. A factory system manages the manufacturing process for a product by controlling a route of operations to be performed by various manufacturing tools in the factory to produce the product. Different manufacturing tools may be used in each operation, multiple manufacturing tools may work together to perform a single operation, and a tool may be used at more than one stage of a single operation.

Various types of information relate to the manufacturing operations performed in the factory. Often the information for performing a manufacturing process is maintained as documents or files, which are referred to herein as configuration documents. For example, a type of configuration document is a specification document that specifies the manufacturing processes to create a particular layer on a wafer in manufacturing a particular semiconductor chip. Typically, a specification document is a file that is read by an equipment interface, which is a software application running on a dedicated computer system that controls a manufacturing tool. Because various tools can be involved in a single operation, the equipment interface for each tool must have access to an identical copy of the specification document.

In a semiconductor factory, losing even a few minutes of operation of a single tool is extremely expensive. Accordingly, changes to configuration documents, such as specification documents and recipes, are avoided, and typically very few people are authorized to make such a change. When such changes must occur, the changes are tested rigorously and subject to an extensive approval process, because of the cascading effects of a single change.

In a typical semiconductor manufacturing facility, the specification document includes a recipe for each manufacturing tool involved in the operation. A recipe is a set of instructions that causes a tool to perform a particular operation on the silicon wafer. As an example, in an etching manufacturing process, an etcher manufacturing tool etches silicon from a wafer. A recipe for a particular operation on the etcher causes the etcher to remove a certain thickness of silicon from the wafer in a particular pattern. Different recipes may apply when manufacturing different products or at different stages in the manufacture of a particular product. The specification document typically includes a separate recipe defined for each possible context in which the etching manufacturing process might be used, thereby duplicating the recipe information numerous times.

An alternative implementation is to provide a single recipe document that contains information about which operations at particular tools in the factory use the recipe.

Problems with the typical implementations described above arise when the manufacture of a product changes or a tool becomes involved in new or different operations. For example, assume that a recipe for etching a particular layer of a particular chip changes. In the first implementation described above, it is necessary to modify the specification documents for each manufacturing tool in the factory that performs the related operation, a time-consuming and error-prone process that is becoming unacceptable in today's 24×7 factory environments.

In the second implementation, it is necessary to change the recipe document each time an operation using the recipe changes, which may be frequent as tools are added and switched to perform different operations.

What is needed is a way to isolate the information related to performing a manufacturing process from the context in which the information is to be used. It is desirable to enable a change to a context and/or a configuration document to be made without affecting numerous tools and operations. Preferably, such a change can be made without requiring such an extensive management review and approval process.

SUMMARY OF THE INVENTION

The present invention provides a way to isolate information related to performing a manufacturing process, called a configuration document, from the context in which the information is used. The process context can be defined, and context-specific information can be removed from the configuration document to create a context-free configuration document. A context/configuration association is independently established between the process context and the context-free configuration document. Because the context/configuration association is independent of both the process context and the context-free configuration document, the context/configuration association can be independently reviewed and approved without affecting other process contexts or configuration documents.

One form of the invention includes a method including specifying a context/configuration association between a context-free configuration document for the manufacturing process and a process context and activating the context/configuration association to implement a change to the manufacturing process. The method may further include approving the context/configuration association prior to the activating the context/configuration association.

In another form of the invention, an apparatus includes an association module to specify a context/configuration association between a context-free configuration document for a manufacturing process and a process context and an activation module to activate the context/configuration association to implement a change to the manufacturing process. The apparatus may further include an approval module to approve the context/configuration association prior to activating the context/configuration association.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by

BRIEF DESCRIPTION OF THE DRAWINGS

The present invention may be better understood, and its numerous objects, features and advantages made apparent to those skilled in the art by referencing the accompanying drawings.

The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

The present invention provides a way to isolate information related to performing a manufacturing process, called a configuration document, from the context in which the information is used. An operation to be performed by a particular tool at a particular point in time in a manufacturing process is determined by several variables, such as the type of tool, the product being manufactured, the route of operations necessary to manufacture the product, and the operations completed thus far. Collectively, these variables and their values are referred to herein as a process context for performing a manufacturing process.

The process context can be defined, and context-specific information can be removed from the configuration document to create a context-free configuration document. A context/configuration association can be independently established between the process context and the context-free configuration document. Because the context/configuration association is independent of both the process context and the context-free configuration document, the context/configuration association can be independently reviewed and approved without affecting other process contexts or configuration documents.

Figure 1:
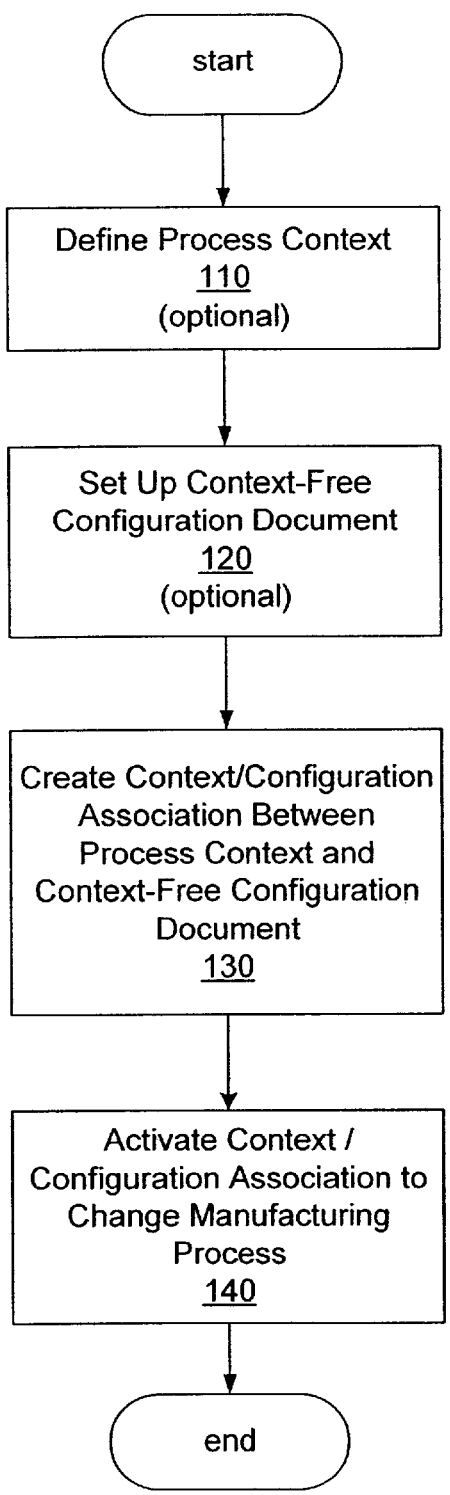
FIG. 1 is a flowchart of the process of creating an independent context/configuration association between a process context and a configuration document with instructions for performing the manufacturing process.

FIG. 1 is a flowchart of a method of creating and using an independent context/configuration association between a process context and a configuration document including instructions for performing the manufacturing process. In optional Define Process Context step 110, a process context is defined. A process context can be defined as a set of variables and values for the variables that must be satisfied. The process context is true when all variable values are satisfied according to the definition. Having a single process context definition eliminates the need to maintain multiple process context strings in various configuration documents. Once a process context is defined, it can be associated with a number of different configuration documents.

In a typical manufacturing environment, a number of process contexts may already be defined, so that the user does not need to define a process context. An embodiment of the invention also can include a module to define a process context and a module to obtain approval of a process context definition.

In optional Set Up Context-Free Configuration Document step 120, a context-free configuration document including instructions to be used to perform a manufacturing process is set up. Context information can be removed from configuration documents to create context-free configuration documents, thereby greatly simplifying the configuration documents themselves as well as their maintenance. In a typical manufacturing environment, a number of configuration documents may already be defined, so that the user does not need to set up a context-free configuration document. An embodiment of the invention also can include a module to set up a context-free configuration document and a module to obtain approval of the context-free configuration document.

In Create Context/Configuration Association between Process Context and Context-Free Configuration Document step 130, the process context is associated with the context-free configuration document providing instructions to be performed by the manufacturing process when the process context is true. The context/configuration association is an independent entity from the process context and the context-free configuration document, and therefore, can be independently implemented and approved. The scope of the invention also includes deactivating a context/configuration association between a process context and a context-free configuration document, enabling changes of the manufacturing process to be easily made as needed.

In Activate Association to Change Manufacturing Process step 140, the context/configuration context/configuration association can be activated to change the manufacturing process. For example, when the context/configuration association is activated, the manufacturing process is performed using the instructions in the context-free configuration document when the process context is true. Furthermore, the activation can be independently approved by a manager.

One embodiment of the present invention includes a user interface for defining process contexts, setting up context-free configuration documents, and specifying context/configuration associations between process contexts and context-free configuration documents. Any user with access to the user interface can create a context-free configuration document and/or process context and a context/configuration association. The user interface may include the capability of sending a context/configuration association into a signoff, or approval, mode. In signoff mode, the context/configuration association does not activate until approval is obtained from one or more persons responsible for approving the context/configuration association. Once the context/configuration association is approved, the context/configuration association is activated and used to perform the manufacturing process. The author of the context/configuration association can be notified that the context/configuration association has been activated.

Figure 2:
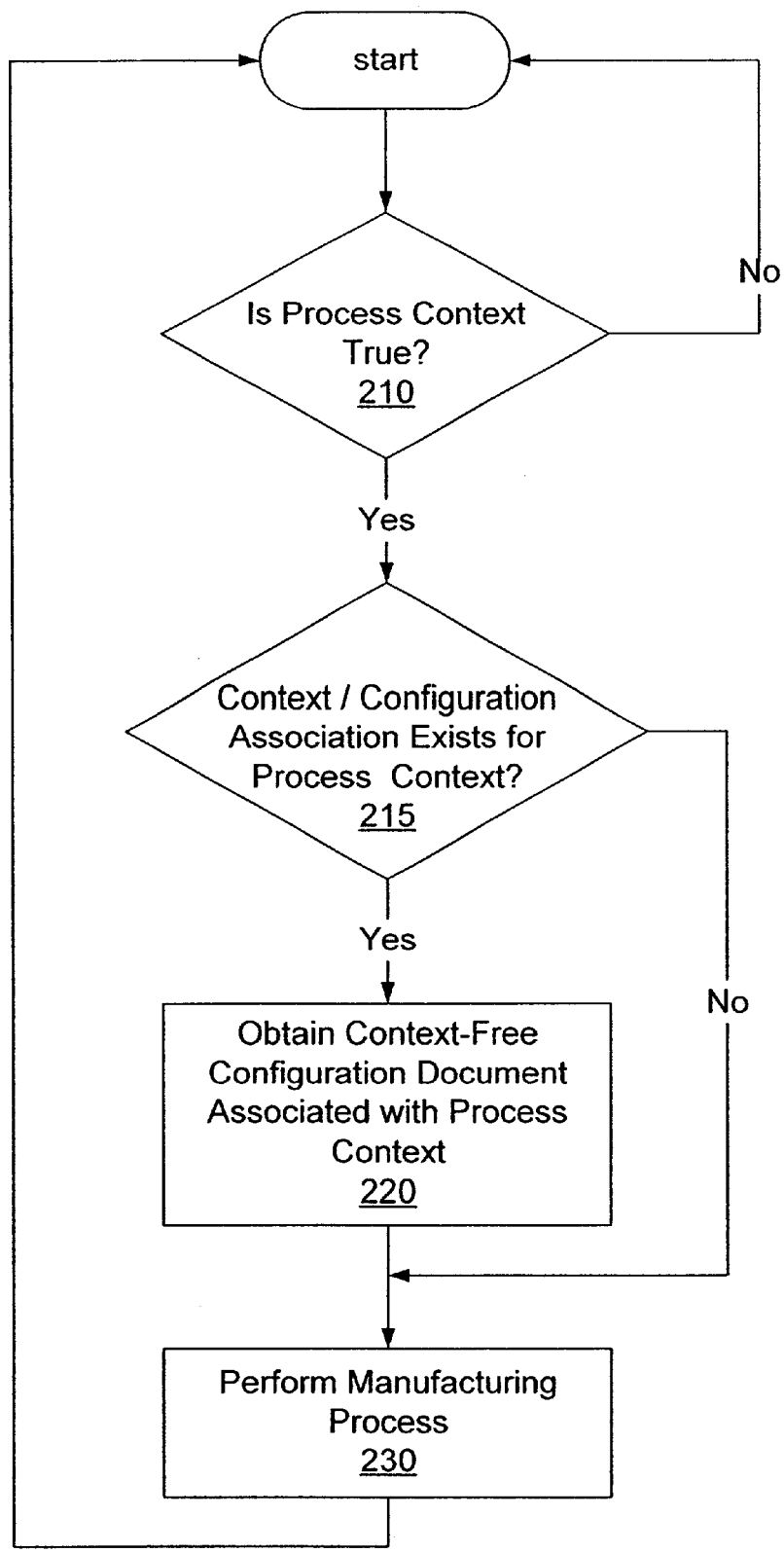
FIG. 2 is a flowchart of the manufacturing process using the present invention.

FIG. 2 is a flowchart of the manufacturing process using the present invention. The present invention can be considered to operate in a "wait state" until a particular process context is true. At Is Process Context True decision point 210, a determination is made whether the process context is true. If the process context is not true, decision point 210 is repeated until the process context is true. When the process context is true, control proceeds to Association Exists for Process Context decision point 215.

At Context/Configuration Association Exists for Process Context decision point 215, if no context/configuration association exists, control proceeds to Perform Manufacturing Process 230 and the manufacturing process is performed. At Context/Configuration Association Exists for Process Context decision point 215, if a context/configuration association exists, control proceeds to Obtain Context-Free Configuration Document Associated with Process Context step 220. The context-free configuration document associated with the process context may include instructions related to the manufacturing process.

In Perform Manufacturing Process step 230, the manufacturing process is performed. If a context/configuration association exists, the instructions from the context-free configuration document associated with the process context may be used to perform the manufacturing process.

For example, assume that a given recipe is to be used to perform operation A by a manufacturing tool B when manufacturing product C at stage D of the manufacturing process for product C. The process context can be defined as true when the operation is A, tool is B, product is C, and stage is D. The recipe can be set up as a context-free configuration document and associated with the process context. During the manufacturing process, when the process context is true, the context-free configuration document containing the recipe is read and the recipe used to perform the manufacturing process for the product C at stage D, operation A and tool B.

Figure 3:
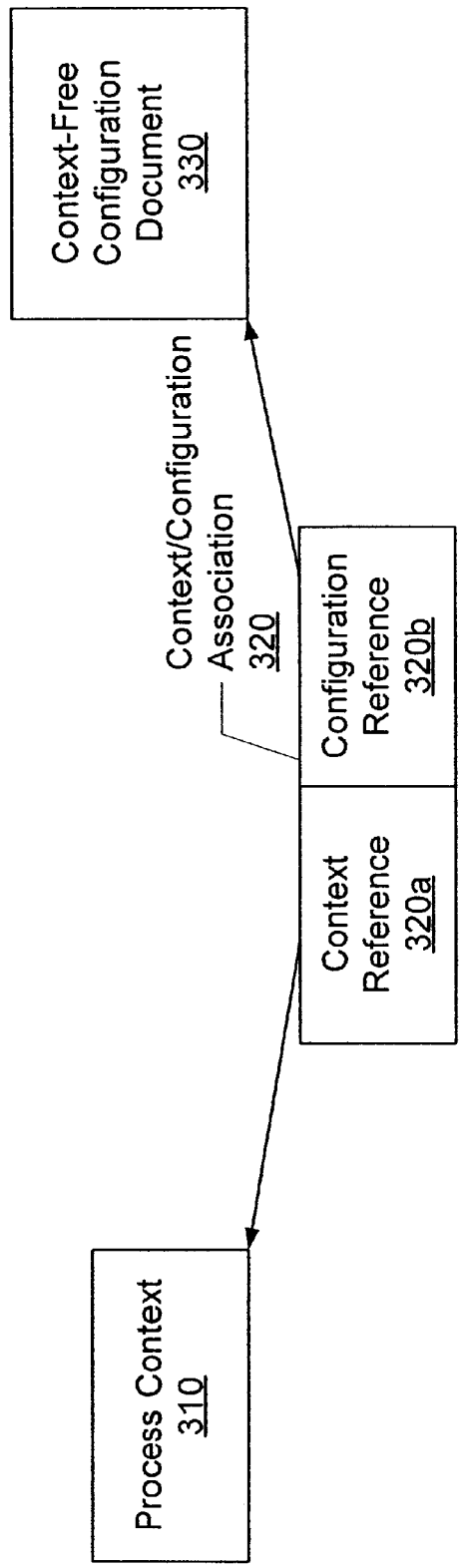
FIG. 3 is a block diagram of a context/configuration association between a process context and a context-free configuration document.

FIG. 3 is a block diagram of a context/configuration association between a context-free configuration document and a process context. Process context 310 includes the definition of a context in which a manufacturing process is performed. For example, the variables operation, tool, product, and stage, and their respective values, provide a process context. One of ordinary skill in the art will recognize that process context 310 need not be in a particular form and may correspond to a database record or field value, to values of one or more variables in memory, to a file, or to other possible forms that can provide persistent availability of the process context.

Context-free configuration document 330 may include instructions such as a recipe for a tool to perform a particular operation of a manufacturing process. The present invention has been described in the context of a recipe for performing a manufacturing process, although other types of context-free configuration documents may also be associated with a manufacturing process. These other types of documents include a process control strategy, indicating that a particular set of instructions such as a recipe is used in a particular set of operations; a data collection plan for collecting data related to the manufacturing process; a certification document showing certification of an operator that is required before the operator can perform the manufacturing process; and other similar types of documents related to manufacturing processes. One of ordinary skill in the art will recognize that context-free configuration document 330 need not be in a particular form and may correspond to a database record or field value, to values of one or more variables in memory, to a file, or to other possible forms that can provide persistent availability of the context-free configuration document.

Context/Configuration Association 320 provides a context/configuration association between process context 310 and context-free configuration document 330. In this example, the context/configuration association takes the form of a Context Reference 320*a* and a Configuration Reference 320*b*. The context/configuration association itself is independent of the process context 310 and the context-free configuration document 330, and the context/configuration association contains a reference to, as opposed to the contents of, process context 310 and context-free configuration document 330. One of ordinary skill in the art will recognize that context/configuration context/configuration association 320 need not be in a particular form and may correspond to a database record or field values, to values of one or more variables in memory, to a file, or to other possible forms that provide persistent availability of the context/configuration association.

The scope of the invention also includes specifying an effective time period for a context/configuration association. During the effective time period, the manufacturing process is performed using the context/configuration association between a process context and a context-free configuration document. Outside the effective time period, the context/configuration association has no effect on the manufacturing process; it is as if the context/configuration association does not exist. If another context/configuration association is currently in effect when the effective time period starts, the previous context/configuration association can be deactivated and archived when the newly effective context/configuration association takes effect.

The invention has been described in terms of a single process context, although one of skill in the art will easily recognize that many process contexts may be defined and determined to be true simultaneously. In addition, a single process context may be associated with a number of context-free configuration documents, and a single context-free configuration document may be associated with a number of process contexts.

One of ordinary skill in the art will recognize that the method described above with regard to the Figures can be automated using an apparatus or computer system. For example, the apparatus or computer system can include a context/configuration association module for creating a context/configuration association between a process context and a context-free configuration document containing information to be used when the process context is true. The apparatus or computer system may further include an activation module to activate the context/configuration association. The apparatus or computer system can further include an approval module for approving the context/configuration association.

The present invention provides many advantages. The invention allows a context-free configuration document for an operation to be specified separately from the process context in which the context-free configuration document is to be used. Furthermore, a context/configuration association between the process context and the context-free configuration document exists independently of the process context and the context-free configuration document. Separating the context-free configuration document from the process context greatly simplifies maintenance of both, as no duplication of the context-free configuration document or of the process context is necessary.

By separately specifying the process context, context-free configuration document, and context/configuration association, document management features such as version control and searching can be used to manage each specification. Versions of the context/configuration association, process context, and context-free configuration document can be maintained so that change tracking is possible. Signoff procedures can be implemented for each of the context/configuration association, process context, and context-free configuration document. Context/configuration associations, process contexts, and context-free configuration documents can be created via a user interface by any user but not placed into production until necessary management approval has been obtained. Process contexts can be specified only once and associated with as many context-free configuration documents as are applicable.

In one embodiment, the context/configuration association is implemented as a versioned object which has built-in signoff procedures for management approval, time-of-effect tracking features, and searching capabilities. In other embodiments, the process context and/or context-free configuration document can be similarly implemented as versioned objects.

OTHER EMBODIMENTS

The present invention has been described in the context of software applications running on one or more computer systems. However, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM and transmission media such as digital and analog communication links, as well as media storage and distribution systems developed in the future.

Additionally, the foregoing detailed description has set forth various embodiments of the present invention via the use of block diagrams, flowcharts, and examples. It will be understood by those within the art that each block diagram component, flowchart step, and operation and/or element illustrated by the use of examples can be implemented, individually and/or collectively, by a wide range of hardware, software, firmware, or any combination thereof. However, those skilled in the art will recognize that the embodiments disclosed herein, in whole or in part, can be equivalently implemented in standard integrated circuits, as a computer program running on a computer, as firmware, or as virtually any combination thereof Designing the circuitry and/or writing the programming code for the software or firmware would be well within the skill of one of ordinary skill in the art in light of this disclosure.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are exemplary only, and are not exhaustive of the scope of the invention. Consequently, the invention is intended to be limited only by the spirit and scope of the appended claims, giving full cognizance to equivalents in all respects.

What is claimed is:

1. A method for controlling a manufacturing process comprising:

specifying a context and configuration association between a context-free configuration document for the manufacturing process and a process context; and activating the context and configuration association to implement a change to the manufacturing process; wherein the context and configuration association is independent of the process context and the context free configuration document.

2. The method of claim 1 further comprising:

approving the context and configuration association prior to the activating the context and configuration association.

3. The method of claim 1 wherein the change comprises performing the manufacturing process according to the context-free configuration document when the process context is true.

4. The method of claim 1 wherein the process context comprises an operation of a route of operations for manufacturing a product.

5. The method of claim 1 wherein the process context comprises an operation of a manufacturing tool.

6. The method of claim 1 wherein the context-free configuration document comprises a specification document for performing the manufacturing process.

7. The method of claim 1 wherein the context-free configuration document comprises instructions for performing the manufacturing process.

8. The method of claim 1 wherein the context-free configuration document comprises a recipe for performing the manufacturing process.

9. The method of claim 1 wherein the manufacturing process is a semiconductor fabrication process; and the context-free configuration document corresponds to a recipe for performing the semiconductor fabrication process.

10. The method of claim 1 wherein the activating the context and configuration association removes a first context and configuration association.

11. The method of claim 10 further comprising:

deactivating the first context and configuration association when a first approval is obtained; and obtaining a second approval before activating the context and configuration association.

12. An apparatus comprising:

an association module to specify a context and configuration association between a context-free configuration document for a manufacturing process and a process context; and an activation module to activate the context and configuration association to implement a change to the manufacturing process; wherein the context and configuration association is independent of the process context and the context-free configuration document.

13. The apparatus of claim 12 further comprising:
an approval module to approve the context and configuration association prior to activating the context and configuration association.

14. The apparatus of claim 12 further comprising:
a performance module for performing the manufacturing process according to the context-free configuration document when the process context is true.

15. The apparatus of claim 12 further comprising:
a user interface module operable to:
define die process context; and set up the context-free configuration document.

16. The apparatus of claim 12 further comprising:
a user interface module operable to associate the process context and the context-free configuration document.

17. A computer program product comprising:
association instructions to specify a context and configuration association between a context-free configuration document for a manufacturing process and a process context;
activation instructions to activate the context and configuration association to implement a change to the manufacturing process; and
a computer-readable medium for storing the association instructions and the activation instructions; wherein
the context and configuration association is independent of the process context and the context-free configuration document.

18. The computer program product of claim 17 further comprising:
approval instructions to approve the context and configuration association prior to activating the context and configuration association;
wherein
the computer-readable medium further stores the approval instructions.

19. The computer program product of claim 17 further comprising:
performance instructions for performing the manufacturing process according to the context-free configuration document when the process context is true;
wherein
the computer-readable medium further stores the performance instructions.

20. The computer program product of claim 17 further comprising
user interface instructions operable to:
define the process context; and
set up the context-free configuration document;
wherein
the computer-readable medium further stores the user interface instructions.

21. The computer program product of claim 17 further comprising:
user interface instructions operable to associate the process context and the context-free configuration document;
wherein
the computer-readable medium further stores the user interface instructions.

* * * * *